D. C. ANDERSON.
SPRING WHEEL.
APPLICATION FILED JUNE 3, 1912.
1,052,027.
Patented Feb. 4, 1913.
2 SHEETS—SHEET 1.
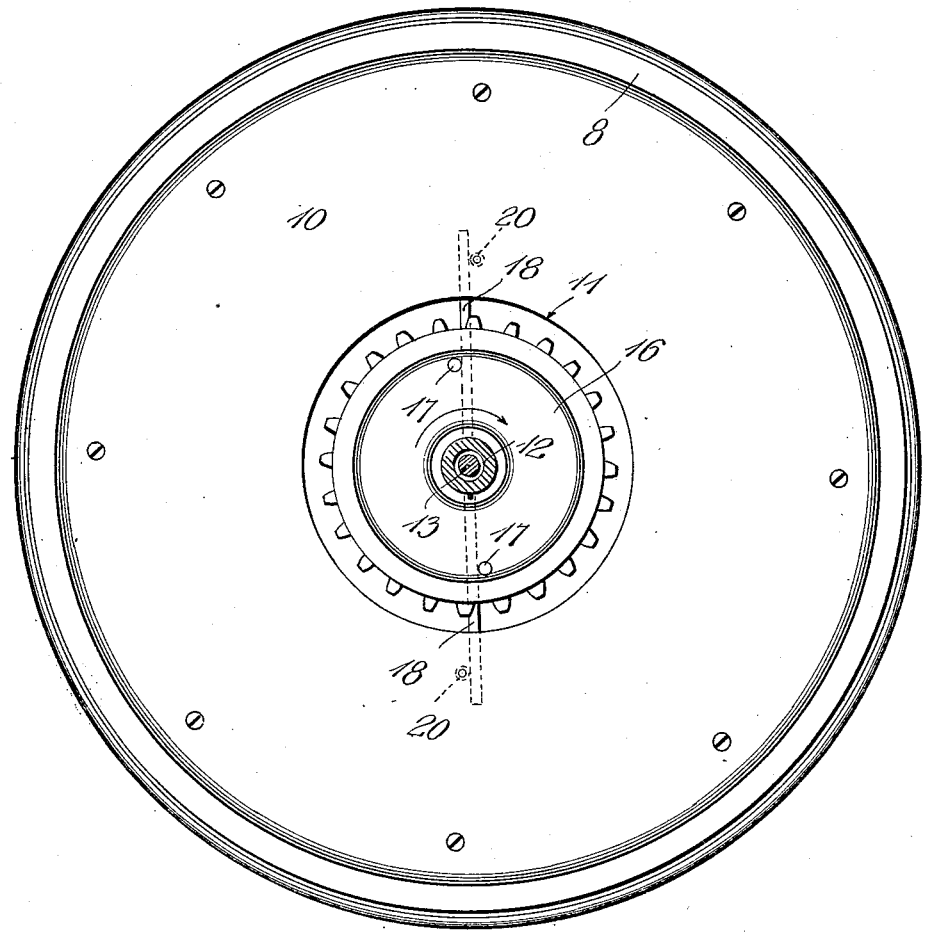
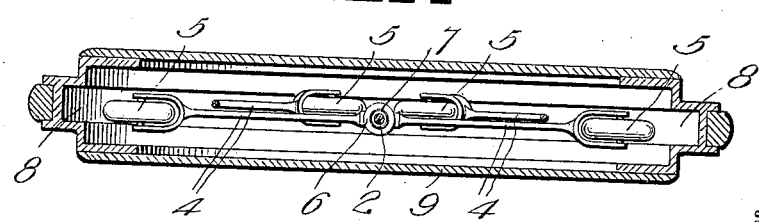
Witnesses
Inventor
D. C. Anderson
Attorneys

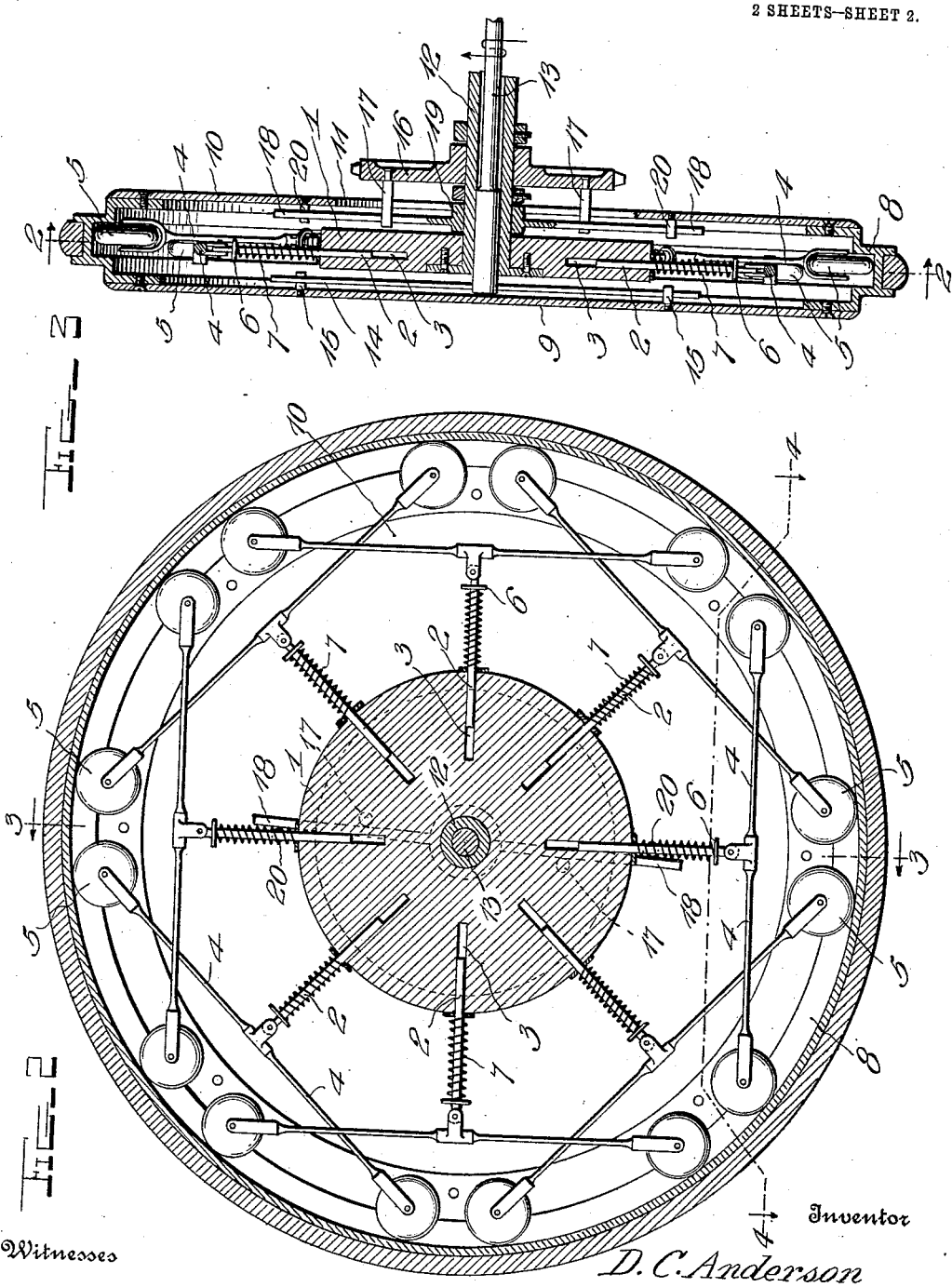

UNITED STATES PATENT OFFICE.

DAVIS C. ANDERSON, OF LAPRAIRIE, MINNESOTA.

SPRING-WHEEL.

1,052,027.  Specification of Letters Patent.  Patented Feb. 4, 1913.

Application filed June 3, 1912. Serial No. 701,348.

*To all whom it may concern:*

Be it known that I, DAVIS C. ANDERSON, a citizen of the United States, residing at Laprairie, in the county of Itasca and State of Minnesota, have invented certain new and useful Improvements in Spring-Wheels; and I do declare the following to be a full, clear, and exact description of the invention, such as will enable others skilled in the art to which it appertains to make and use the same.

This invention relates to improvements in spring wheels.

One object of the invention is to provide a spring wheel having an improved construction and arrangement of spring projected spokes connected at their outer ends with rim engaging wheels or rollers adapted to revolubly engage a rim mounted thereon.

Another object is to provide a spring wheel having an improved means for connecting the same with a suitable driving mechanism.

With these and other objects in view, the invention consists of certain novel features of construction, and the combination and arrangement of parts as will be more fully described and claimed.

In the accompanying drawings; Figure 1 is an inner side view partly in section of a wheel constructed in accordance with my invention; Fig. 2 is a longitudinal section of the same taken on the line 2—2 of Fig. 3;
Fig. 3 is a cross sectional view taken on the line 3—3 of Fig. 2; Fig. 4 is a cross sectional view taken on the line 4—4 of Fig. 2.

My improved wheel comprises a hub 1 which may be of any suitable shape and is here shown as of circular form. The hub 1 is provided with a series of radially projecting spokes 2 the inner ends of which are slidably engaged with sockets 3 in the hub and the outer ends of which are pivotally connected at the center of right angularly disposed wheel or roller carrying bars 4 on the ends of which are revolubly mounted rim engaging wheels or rollers 5. The bars 4 are preferably formed of spring metal whereby the same possess more or less resiliency. On the spokes 2 near their hinged connection with the bars 4 are stop collars 6 between which and the edge of the hub are arranged coiled springs 7.

The wheel is provided with a channel shaped rim 8 with which the wheels or rollers 5 are revolubly engaged and on which said rim turns when driven by the operating mechanism hereinafter described. The outer side of the wheel is covered or inclosed by a circular plate 9 while the inner side of the wheel is covered by a similar plate 10, said plate 10 having in its center an opening 11 of sufficient size to permit the movement of the axle under the weight of the vehicle supported thereby. The outer edges of the plates 9 and 10 are secured in any suitable manner to the inner edges of the rim 8.

The hub 1 of the wheel is fixedly mounted on the end of an outer tubular axle 12 in which and in a bearing aperture in the hub is revolubly mounted an inner driving axle 13. The axle 13 projects beyond the outer side of the hub and has fixed on its projecting end a cross bar 14 which projects in opposite directions a suitable distance from the axle. The bar 14 is adapted to engage driving studs 15 arranged on and projecting inwardly from the plate 9 forming the outer side of the casing.

Revolubly mounted on the outer tubular axle 12 is a spur gear wheel 16 which is connected by short inwardly projecting bars 17 to radially projecting arms 18, the inner ends of which are connected with a collar 19 loosely mounted on the adjacent portion of the tubular outer axle 12. The outer portions of the arms 18 are adapted to engage inwardly projecting driving studs 20 secured to the inner side of the plate 10 which forms the inner member of the casing of the wheel. The inner axle 13 is provided with any suitable driving mechanism which is also connected with the gear wheel 16 whereby motion is imparted to said axle and wheel and to the bar 14 and arms 18 carried by these parts whereby the engagement of said bar and arms with the studs 15 and 20 on the plates 9 and 10 of the casing drive the latter and the rim in the proper direction for propelling the vehicle.

By means of a wheel constructed in accordance with my invention and as herein shown and described it will be seen that the weight of the vehicle which will be mounted on the tubular outer axle 12 will be yieldingly supported by the spring projected spokes of the wheel, said spokes and the resilient roller supporting bars 4 absorbing all shocks, and jars occasioned by the wheel coming into contact with obstructions or passing over rough surfaces.

From the foregoing description taken in connection with the accompanying drawings, the construction and operation of the invention will be readily undertsood without requiring a more extended explanation.

Various changes in the form, proportion and the minor details of construction may be resorted to without departing from the principle or sacrificing any of the advantages of the invention as claimed.

Having thus described my invention, what I claim is;

1. A wheel comprising a hub, a series of radial spring projected spokes slidably mounted in said hub, rim engaging rollers carried by the outer ends of said spokes, a channel shaped rim revolubly engaged with said rollers, a driving axle revolubly mounted in said hub, radially projecting bars fixed on the end of said axle, side plates secured to the edges of said rim to form a casing for the wheel, driving studs arranged on the inner side of said outer plate and adapted to be engaged by the cross bar on said driving axle whereby the movement of the latter is imparted to said rim to drive the latter on the rollers carried by said spokes.

2. A wheel comprising a hub, a series of radial spring projected spokes slidably mounted in said hub, rim engaging rollers carried by the outer ends of said spokes, a channel shaped rim revolubly engaged with said rollers, a driving axle revolubly mounted in said hub, radially projecting bars fixed on the end of said axle, side plates secured to the edges of said rim to form a casing for the wheel, driving studs fixed on and projected inwardly from said plates, the studs on said outer plate being adapted to be engaged by the cross bar on said driving axle, an outer tubular axle arranged on said inner driving axle and having its end fixedly connected to said hub, a gear wheel revolubly mounted on said tubular axle and driving arms connected with said gear wheel and adapted to be engaged with the driving studs on said inner side plate whereby the movement of said gear wheel is imparted to said plate and the rim of the wheel, said rim being driven thereby and by the engagement of the cross bar on said driving axle with the studs on the outer plate of the casing.

3. A wheel comprising a hub, a series of radial spring projected spokes slidably mounted in said hub, bars hingedly connected to the outer ends of said spokes, rim engaging rollers revolubly mounted in the terminal ends of said bars, the latter crossing one another, whereby the rollers are adjacently arranged and a rim revolubly mounted on said rollers.

In testimony whereof I have hereunto set my hand in presence of two subscribing witnesses.

DAVIS C. ANDERSON.

Witnesses:
 A. L. SHELDON,
 RALPH BRANDON.

---

Copies of this patent may be obtained for five cents each, by addressing the "Commissioner of Patents, Washington, D. C."